UNITED STATES PATENT OFFICE.

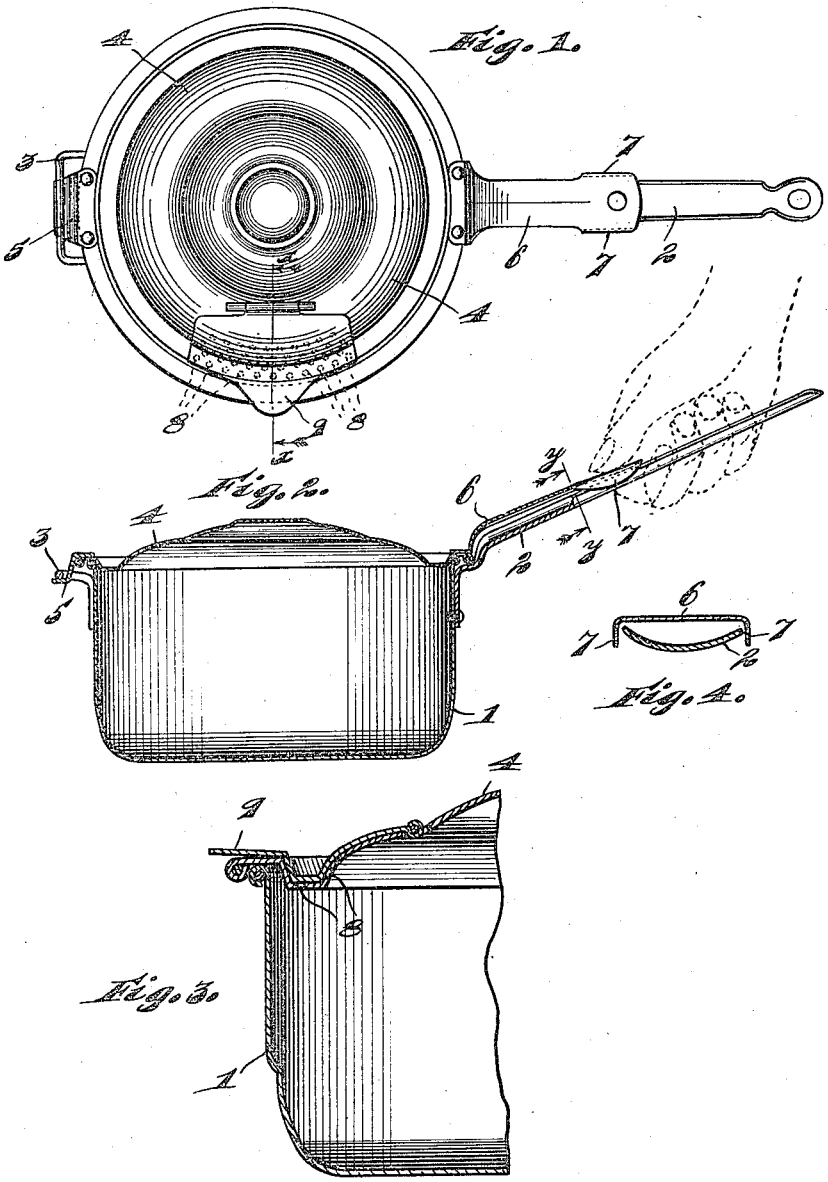

JENNIE PAQUETTE, OF CHICAGO, ILLINOIS, ASSIGNOR TO ISABELLE CARROLL, OF CHICAGO, ILLINOIS.

COOKING UTENSIL.

1,241,010.     Specification of Letters Patent.     Patented Sept. 25, 1917.

Application filed July 6, 1915. Serial No. 38,126.

*To all whom it may concern:*

Be it known that I, JENNIE PAQUETTE, a citizen of the United States, and a resident of the city of Chicago, county of Cook, and State of Illinois, have invented certain new and useful Improvements in Cooking Utensils, of which the following is a specification.

My invention relates to improvements in cooking utensils, and has for its object the production of a vessel having a cover which may be readily and easily held in position on the vessel during tilting of the latter, as when pouring therefrom.

A further object is the production of a cooking utensil as mentioned, which will be of simple construction and efficient in use.

Other objects will appear hereinafter.

The invention consists in the combinations and arrangements of parts hereinafter described and claimed.

The invention will be best understood by reference to the accompanying drawing forming a part of this specification, and in which, Figure 1 is a top plan view of a cooking utensil embodying the invention.

Fig. 2 is a substantially central vertical section of the cooking utensil, and

Figs. 3 and 4 are enlarged sections taken on lines *x—x* and *y—y* respectively of Figs. 1 and 2.

The preferred form of construction, as illustrated in the drawing, comprises an upwardly opening vessel 1 in the form of a sauce pan, said vessel being provided at one side with an outwardly and upwardly projecting handle 2. Provided at the opposite side of said vessel, adjacent the upper edge thereof, is an outwardly projecting loop 3.

Coöperating with the vessel 1 is a cover 4 adapted to rest upon the upper edge of said vessel in order to close the same, as clearly shown in Figs. 2 and 3. Provided at one side of cover 4 is an outwardly projecting lip 5 adapted for loose engagement with the bight of loop 3 in order to hold said side of the cover in closing position upon the vessel. Rigidly secured to and outwardly projecting from the opposite side of cover 4 is an arm 6, the arrangement of said arm being such that when the cover is in position upon the vessel, with the lip 5 thereof engaging with loop 3, said arm will be positioned directly over the handle 2, as clearly shown in the several views. Said arm 6 is of such length that the same is adapted to project well along the handle 2 so as to permit of ready engagement of the same by the hand or the thumb of the hand grasping the handle 2, as clearly shown in Fig. 2. This being so, it will be seen that the pressure of the hand in grasping the handle 2 will also serve to press the arm 6 downwardly and thus to hold the adjacent side of the cover 4 in operative position upon the vessel. Hence, with this arrangement, it will be seen that with the lip 5 of the cover engaging with the loop 3 of the vessel and with the arm 6 engaged by the hand grasping the handle 2, the cover of the vessel will be securely held in operative position. With this arrangement in order to remove the cover, it is only necessary to rock the arm 6 upwardly, since upon so doing the lip 5 will rock downwardly from engagement with the loop 3 so as to permit of complete removal of the cover.

In order to insure against lateral shifting of the arm 6 from registration with the handle 2, the outer end of the former is provided with depending flanges or ears 7 which form a channel at the under side of said arm adapted to receive said handle, as clearly shown in Fig. 4. The sides of the channel thus formed, that is the flanges or ears 7 engaging with the longitudinal edges of the handle 2, obviously will prevent any lateral shifting of the arm 6 and hence any horizontal shifting of the cover.

The cover is provided adjacent the periphery thereof, midway between the lip 5 and arm 6, with perforations 8 which permit of draining of liquid from the vessel without removing the cover, such as is generally the practice in the draining of water from boiled potatoes. A hinged closure plate 9 provided upon the upper side of cover 4 coöperates with openings 8 to close the same except when draining the vessel.

With the construction set forth it will be seen that the possibility of scorching or burning the hands, such as frequently results in endeavoring to hold down a hot cover upon a cooking utensil, in pouring from the latter, will be positively precluded, since with the present construction the cover is held down without any need of touching the same with the hands.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination of an upwardly opening vessel having an outwardly projecting handle at one side; a keeper at the opposite side of said vessel; a cover for said vessel; means at one side of said cover for engagement with said keeper to hold said side of the cover in position on the vessel; a projection at the opposite side of said cover adapted to register with said handle at the upper side thereof for engagement by the hand engaging said handle; and depending means on said projection for engagement with said handle for retaining said projection in registration with said handle, substantially as described.

2. The combination of an upwardly opening vessel having an outwardly projecting handle at one side; a keeper at the opposite side of said vessel; a cover for said vessel; means at one side of said cover for engagement with said keeper to hold said side of the cover in position on the vessel; a projection at the opposite side of said cover adapted to register with said handle at the upper side thereof for engagement by the hand engaging said handle; and depending ears on said projection adapted to embrace said handle to retain said projection in registration therewith, substantially as described.

3. The combination of an upwardly opening vessel having an outwardly projecting handle at one side thereof; a loop at the opposite side of said vessel; a cover for said vessel; an outwardly projecting lip on said cover on one side thereof for engagement in said loop to hold said side of the cover in position on the vessel; an outwardly projecting arm on said cover at the opposite side thereof adapted to register with the upper side of the handle, when the cover is positioned on the vessel, said arm extending well along said handle for ready engagement by the thumb of the hand engaging said handle; and depending flanges on the outer end of said arm adapted for engagement with the longitudinal edges of said handle to prevent lateral movement of said arm, and said cover being provided with an aperture adjacent its edge midway between said lip and said arm, substantially as described.

In testimony whereof I have signed my name to this specification in the presence of two subscribing witnesses.

JENNIE PAQUETTE.

Witnesses:
JOSHUA R. H. POTTS,
HELEN F. LILLIS.

Copies of this patent may be obtained for five cents each, by addressing the "Commissioner of Patents, Washington, D. C."